United States Patent Office 3,292,944
Patented Dec. 20, 1966

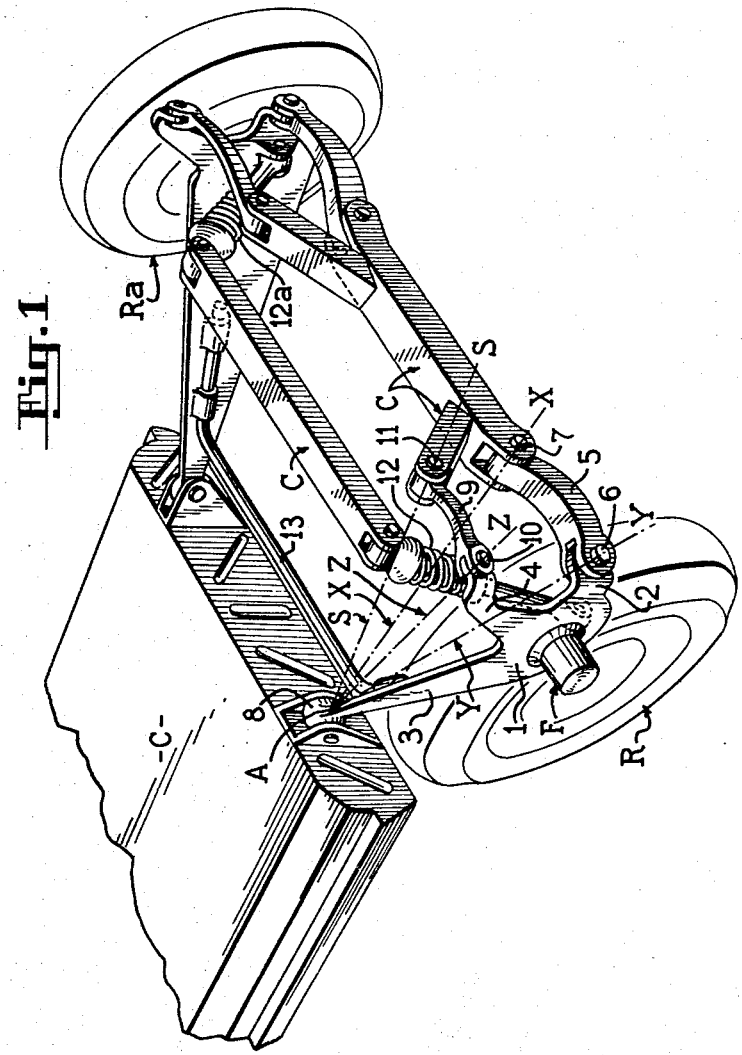

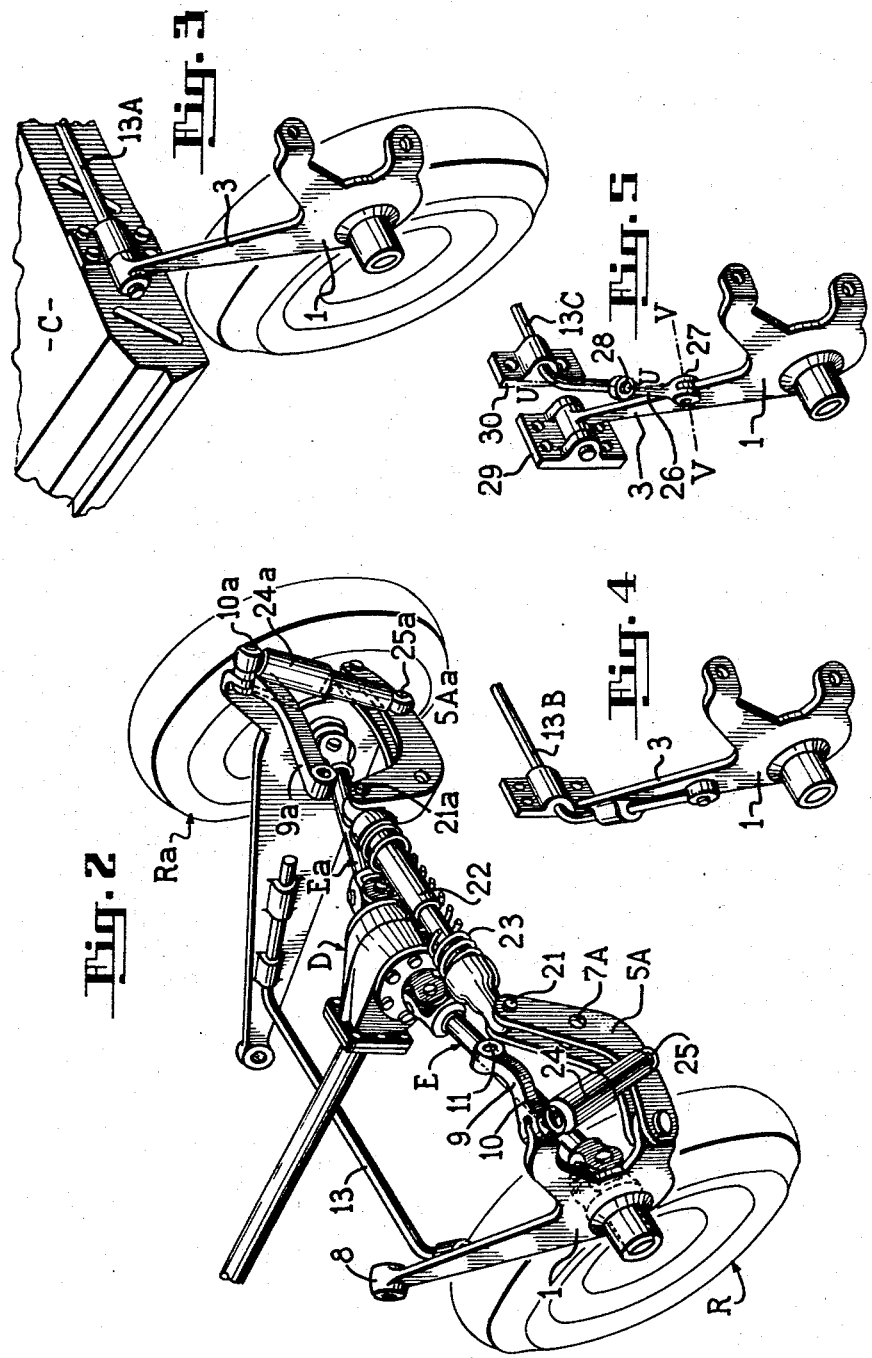

3,292,944
SUSPENSION FOR THE REAR WHEELS OF VEHICLES
Marcel Dangauthier, Paris, France, assignor to La Publicite Francaise, Paris, France, a French body corporate
Filed Jan. 29, 1965, Ser. No. 429,042
Claims priority, application France, Dec. 10, 1964, 998,168
6 Claims. (Cl. 280—124)

The invention relates in a general way to vehicle suspensions, for example automatic vehicle suspensions, and more particularly to the suspensions of the rear wheels which may be the driving wheels.

The object of the invention is to provide a compact suspension which reduces the space consumed by the suspension in the rear part of the vehicle.

Another object of the invention is to provide a particularly simple suspension having a small number of pivotal connections, the latter being of the cylindrical type and therefore producible in conventional, simple and cheap forms.

Another object of the invention is to provide a geometric arrangement of the rear set of wheels which permits varying, by a judicious choice of the points of the suspension layout the camber and the parallelism of the wheels.

A further object of the invention is to provide a suspension which affords the Brouilhet effect, that is to say, a compensation of the rising movement of the body which tends to occur as a result of longitudinal decelerations brought about by braking.

The rear wheel suspension provided by the invention which satisfies these conditions comprises, in respect of each side of the rear set of wheels, a rigid member including a cavity receiving the bearing of the wheel, and three rigid arms, the free end of one of the arms being directly pivoted to the body or other element forming the suspended part of the vehicle, and the free end of each of the other two arms being connected to the body through links of which one end is pivoted to the body and the other is pivoted to the free end of the corresponding arm.

The articulations or pivotal connections of the links are of the cylindrical type having a single degree of freedom; the two pivot points of the ends of each of the two links define, with the common point corresponding to the direct pivotal connection, four axes which are those about which the pivotal connections are pivotable.

Further features and advantages of the invention will be apparent from the ensuing description with reference to the accompanying drawings to which the invention is in no way limited.

In the drawings:

FIG. 1 is a diagrammatic perspective view of a first embodiment of the invention;

FIG. 2 is a diagrammatic perspective view of a second embodiment of the invention;

FIGS. 3, 4 and 5 are partial perspective views of three variants of a detail of the suspension according to the invention.

In the embodiment shown in FIG. 1, a vehicle comprises a set of rear wheels R, Ra mounted on stub axles, such as F. The body and chassis, which constitute the suspended part, are diagrammatically represented by portions C which are assumed to be rigidly integral with each other.

The suspension is symmetrical and only the left part thereof will be described. The elements of the right part which are symmetrical to the corresponding elements of the left part carry the same reference numerals as the elements of the latter with the addition of the letter a.

With reference to the left part of the suspension shown in FIG. 1, it is clear that this suspension comprises a member 1 including a centre part receiving the bearing of the wheel and the braking system of the wheel R. This member 1 has three arms 2, 3, 4 which are integral with said centre part.

The arm 2 is connected to the body through a transverse link 5 whose ends are respectively pivoted to the end of the arm 2 by a cylindrical pivoted connection 6 and to the body by a cylindrical pivotal connection 7.

The end of the arm 3 is pivoted to the body by a pivotal connection 8.

The arm 4 is pivoted to the body by a transverse link 9 which is pivoted to the arm 4 by a cylindrical pivotal connection 10 and to the body by a cylindrical articulation 11.

Thus, this suspension constitutes a three-point suspension including three pivots 8, 7, 11 all of which are located on the body of the vehicle, the first of these pivots connecting the body directly to the member 1 and the other two pivots connecting the body to the member 1 indirectly through the links 5 and 9. The pivots 7, 11 and the pivots 6 and 10 are of the cylindrical type and consequently each of them can consist of a conventional bearing having a spindle and bushing, a ball or roller bearing or the like having rolling elements, or an elastically yieldable pivotal mounting.

Each of these pivots 7, 6, 10, 11 therefore comprises a fixed, well-defined axis of rotation X—X, Y—Y, Z—Z or S—S respectively. According to a feature of the invention, these axes all converge at the centre A of the pivot 8.

This suspension further comprises resilient suspension devices consisting of springs or the like, 12, 12a, combined with dampers. These devices can be, for example, oleopneumatic support elements each comprising a pneumatic resilient element and a damping element; this support element can also comprise a seat corrector which determines the ground clearance of the body as a function of the supported load. Such devices are known and are described for example in the U.S. Patent No. 3,088,726. In this case, the two support elements are mounted in the circuit of a volumetric pump.

This suspension comprises an anti-banking device consisting of a torsion bar 13 rigid with two arms 3 and 3a.

The geometry of the suspension just described lends itself particularly well to a layout which permits solving the problems created by the determination of the camber and parallelism of the wheels, and the Brouilhet effect.

The pivot 8 can furthermore filter the longitudinal movements of the set of wheels for this purpose, the pivot 8 can be formed in the manner of an elastic pivot for example of the type known under the trademark "Silentbloc" whose characteristics of longitudinal stiffness are adapted to the design and mass of the set of wheels and of the wheel.

The suspension can be constructed in another form as shown in FIG. 2 comprising the improvements described in the U.S. Patent application Serial No. 429,043. In FIG. 2, the elements of the body have not been shown in order to render the drawing more clear. The suspension is shown to be applied to a set of driving wheels R, Ra whose differential is designated by the reference character D and the half-axles by the reference characters E and Ea.

In this embodiment, the link 5 shown in FIG. 1 is replaced by a cranked link 5A which is pivoted to the body at 7A and has an arm upwardly extending from 7A. The three pivot points of the body are in this case, therefore, the points 8, 7A and 11. The free end 21 of the arm of the cranked link 5A is connected to the corresponding free end 21a of the arm of the cranked link of the right side 5Aa by a damping device 22 combined with a spring 23 which, owing to the return effect exerted by the cranked links 5A and 5Aa, balances the vertical forces exerted by the wheels. The damping of the movements of the wheels and the movements of the body as concerns roll is insured by the dampers 24, 24a, each of these dampers being interposed between a point 25, 25a, rigid with the body or with the cranked link, and another point rigid with the member 1 and with the link 9, 9a, the point 10, 10a, for example, as shown.

Stiffness counteracting the effect of banking is introduced, as in the embodiment shown in FIG. 1, by the anti-banking torsion bar 13.

Although specific embodiments of the invention have been described, many modifications and changes may be made therein without departing from the scope of the invention as defined in the appended claims.

For example, by way of a variant, the anti-banking bar 13 can be so mounted as to perform the function of a pivot pin for the pivots 8 and 8a. Two examples of a mounting of this type of a bar 13A or 13B are shown in FIGS. 3 and 4.

In the variant shown in FIG. 5, the torsion bar 13C is connected to the arm 3 by an articulated system comprising a link 26 whose ends comprise respectively two elastically yieldable pivots 27, 28, whose axes U—U and V—V are orthogonal. The bar 13C is journalled in two bearings 29, 30 which are rigid with the suspended part.

Having now described my invention what I claim as new and desire to secure by Letters Patent is:

1. A suspension for connecting the rear wheels of a vehicle to the suspended part of the vehicle, said suspension comprising, in respect of each wheel, a rigid member including a housing for the bearing of the wheel and three rigid arms which are rigid with said housing and have ends, a first of the arms having the end thereof directly pivoted to said suspended part, and two substantially parallel links respectively connecting the ends of the other two arms to said suspended part, each link having one end pivotally connected to said suspended part and the other end pivotally connected to the end of the corresponding arm.

2. A suspension for connecting the rear wheels of a vehicle to the suspended part of the vehicle, said suspension comprising, in respect of each wheel, a rigid member which includes a housing for the bearing of the wheel and three rigid arms, a first of the arms having a free end directly pivoted to said suspended part, and the other two arms having free ends connected to said suspension part by links, each link having one end pivoted to said suspension part and the other end pivoted to the corresponding arm, the four pivotal connections of said two links being of the cylindrical type which allows a pivotal movement about a preferential axis which converges toward said direct pivotal connection of said first arm to said suspended part.

3. A suspension as claimed in claim 1, further comprising, in respect of each wheel, a damper combined with resiliently yieldable return means, and inserted between the rigid member and said suspended part, and an anti-banking device consisting of a torsion bar extending at 90° to the planes of the wheels and having ends rigidly secured respectively to the two rigid members.

4. A suspension as claimed in claim 1, said links being substantially contained in a substantially vertical plane at 90° to the planes of said wheels.

5. A suspension for connecting the rear wheels of a vehicle to the suspended part of the vehicle, said suspension comprising, in combination, in respect of each wheel, a rigid member including a housing for the bearing of the wheel, and three rigid arms which are rigid with said housing and have ends, a first of the arms having the end thereof directly pivoted to said suspended part, two substantially parallel links respectively connecting the ends of the other two arms to said suspended part, each link having one end pivotally connected to said suspended part and the other end pivotally connected to the end of the corresponding arm, said links being substantially contained in a substantially vertical plane at 90° to the planes of said wheels, a device for disassociating the pumping or pitching damping and stiffness from the damping of the roll oscillations, said device comprising, in respect of each wheel, an arm rigid with one of said two links pertaining to each wheel and having a free end, connecting means having two end portions spaced apart transversely relative to the planes of said wheels, a damper, and pivotal connections connecting said two end portions of the connecting means respectively to said free ends of said arms pertaining to the two wheels, the distance between said pivotal connections of the connecting means being variable and said damper being operatively connected to said pivotal connections of the connecting means to damp any movement of said pivotal connections of the connecting means toward and away from each other.

6. A suspension as claimed in claim 1, further comprising an anti-banking torsion bar extending at 90° to the planes of said wheels and having ends rigidly secured respectively to said two rigid members and also performing the function of a pivot pin in said direct pivotal connection of said first arm to said suspended part.

References Cited by the Examiner

UNITED STATES PATENTS

| | | | |
|---|---|---|---|
| 2,757,747 | 8/1956 | MacPherson | 280—124 |
| 3,149,690 | 9/1964 | Rosenkrands et al. | 280—124 |

BENJAMIN HERSH, *Primary Examiner.*

M. S. SALES, P. GOODMAN, *Assistant Examiners.*